United States Patent [19]

Kershner

[11] 3,722,637
[45] Mar. 27, 1973

[54] SELF-ADJUSTING DISC BRAKE ASSEMBLY

[75] Inventor: Osborn A. Kershner, St. Joseph, Mich.

[73] Assignee: Lambert Brake Corporation, St. Joseph, Mich.

[22] Filed: Sept. 10, 1970

[21] Appl. No.: 71,022

[52] U.S. Cl. .................................188/196 P, 188/71.8
[51] Int. Cl. ...............................................F16d 65/54
[58] Field of Search ..................188/71.7, 71.8, 196 P

[56] References Cited

UNITED STATES PATENTS

| 2,384,297 | 9/1945 | Goepfrich | 188/71.8 |
|---|---|---|---|
| 2,536,269 | 1/1951 | Driscoll | 188/71.8 |
| 2,888,109 | 5/1959 | Tankersley | 188/71.8 X |
| 3,068,965 | 12/1962 | Mossey | 188/196 P X |
| 2,951,560 | 9/1960 | Smellie | 188/196 P X |
| 3,338,352 | 8/1967 | Guilhamat | 188/196 P |

*Primary Examiner*—Duane A. Reger
*Attorney*—Olson, Trexler, Wolters & Bushnell

[57] ABSTRACT

The invention relates to a self-adjusting brake assembly for retarding the rotational movement of a shaft or axle having a plurality of rotary disc members mounted for both rotational movement therewith and axial movement relative thereto. The assembly includes a plurality of fixed discs carried by a stationary housing, and an actuator plate hydraulically movable so as to force the disc members into frictional engagement with the fixed discs in order to stop the shaft or axle. The assembly is provided with automatic adjuster means for maintaining constant the distance required for moving the actuator plate into engagement with the disc members and discs.

7 Claims, 7 Drawing Figures

Inventor
Osborn A. Kershner
By: Olson, Trexler, Wolters & Bushnell attys.

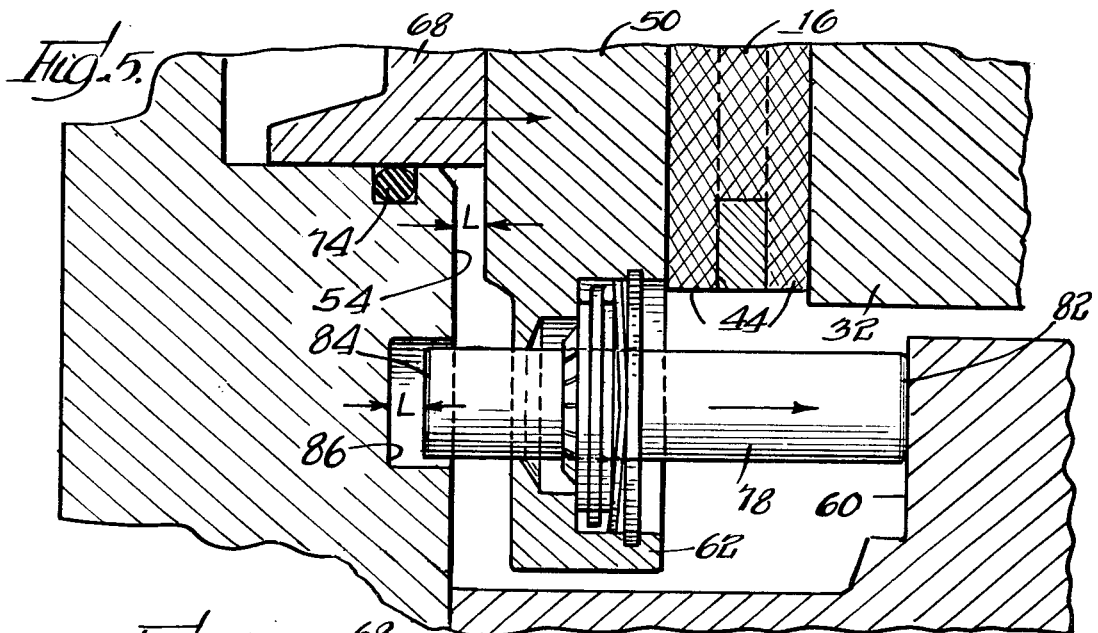
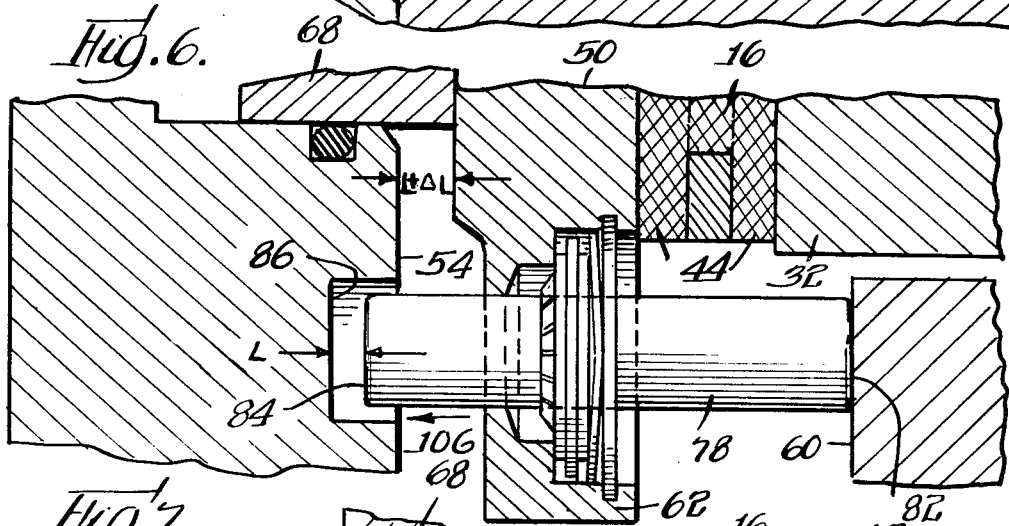
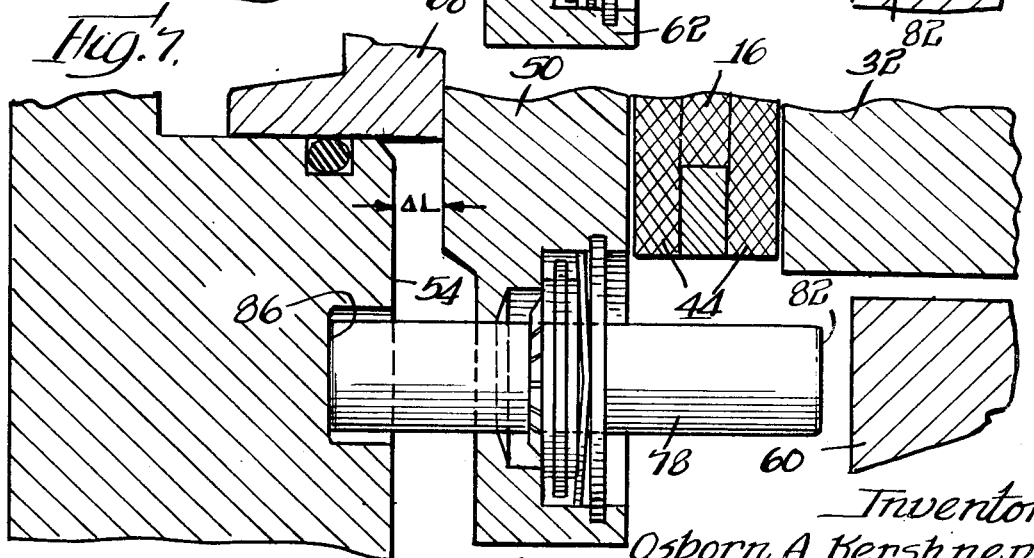

SELF-ADJUSTING DISC BRAKE ASSEMBLY

SUMMARY OF THE INVENTION

The present invention relates generally to a disc brake assembly and more particularly to a disc brake assembly employing self-adjusting means for compensating for disc wear.

DISTINCTION OVER THE PRIOR ART AND OBJECTS

Disc brakes of the general type disclosed and claimed herein are generally used for retarding the movement of a rotating shaft or axle and are quite well known. This type of brake usually includes a plurality of braking discs, which are mounted to the shaft for both rotational movement therewith and axial movement relative thereto. A movable actuator plate is provided for engaging and shifting the braking discs against corresponding fixed surfaces which due to the friction therebetween causes the discs and therefore the shaft to cease from rotating.

It is apparent that as the braking discs function in the aforementioned manner, they tend to wear thin. This, of course, increases the running clearance between the discs, which, in turn, requires a greater shifting distance of the movable actuator plate for stopping the shaft. Therefore, the time required for stopping the shaft is increased, which thereby decreases the efficiency of the brakes and requires more brake fluid per application.

In the past, the aforementioned problem has been dealt with by providing a method of automatically shifting the actuator plate in response to the amount of wear on the discs. One such method disclosed by the prior art contemplates the use of an elongated threaded screw thread mounted through the actuator plate and having a force applied to one end thereof for longitudinally rotating the screw through the actuator plate for thereby repositioning the latter with respect to the braking discs. While this method is quite satisfactory from a functional standpoint, it lacks certain simplicity which is required for manufacturing the over-all brake assembly in a more economical manner.

Accordingly, a general object of the present invention is to provide a new and improved self-adjusting brake assembly which is both simple in design and economical to manufacture.

A more particular object of the present invention is to provide a disc brake assembly employing a new and improved means for compensating for brake lining wear, which means is both simple in design and economical to manufacture.

These and other objects and features of the invention will become more apparent from a reading of the following descriptions.

BRIEF DESCRIPTION OF THE DRAWINGS

FIG. 3 is an enlarged sectional view taken generally along the line 3—3 in FIG. 1, specifically showing the self-adjusting means used with the brake assembly;

FIG. 4 is an enlarged sectional view taken generally along the line 4—4 in FIG. 1 specifically showing the self-adjusting means of FIG. 3;

FIG. 5 is an enlarged side sectional view taken generally along line 3—3 in FIG. 1, specifically displaying the brake assembly in its initial energized position;

FIG. 6 is a similar view to that of FIG. 5 specifically showing the braking assembly in its initial energized position after substantial use; and FIG. 7 is a similar view to that of FIGS. 5 and 6 however with the brake assembly being shown in its de-energized position after substantial use.

DETAILED DESCRIPTION

Figure 1:
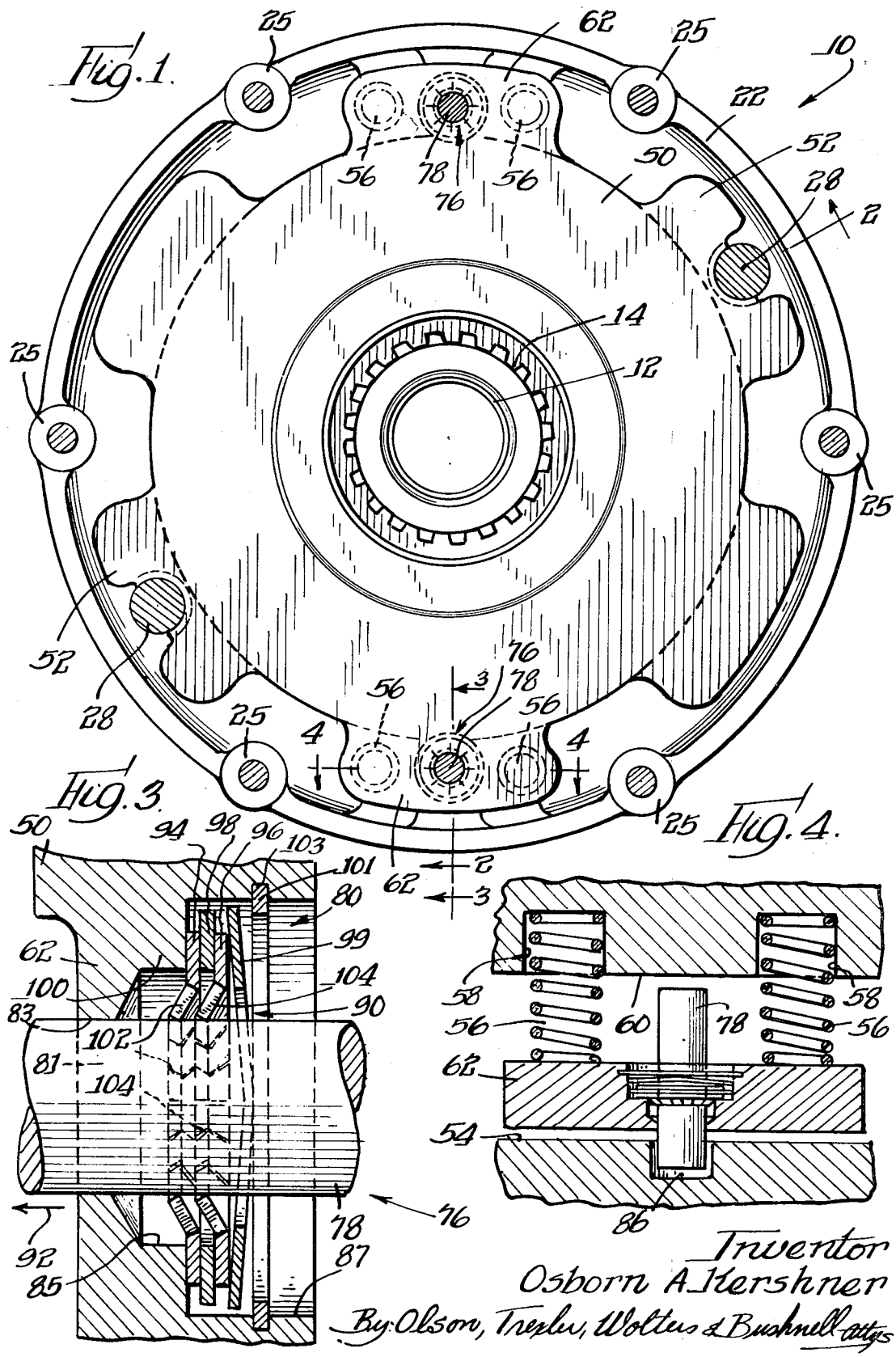
FIG. 1 is a side sectional view of a self-adjusting disc brake assembly constructed in accordance with the present invention, this view being taken generally along the line 1—1 in FIG. 2.
Figure 2:
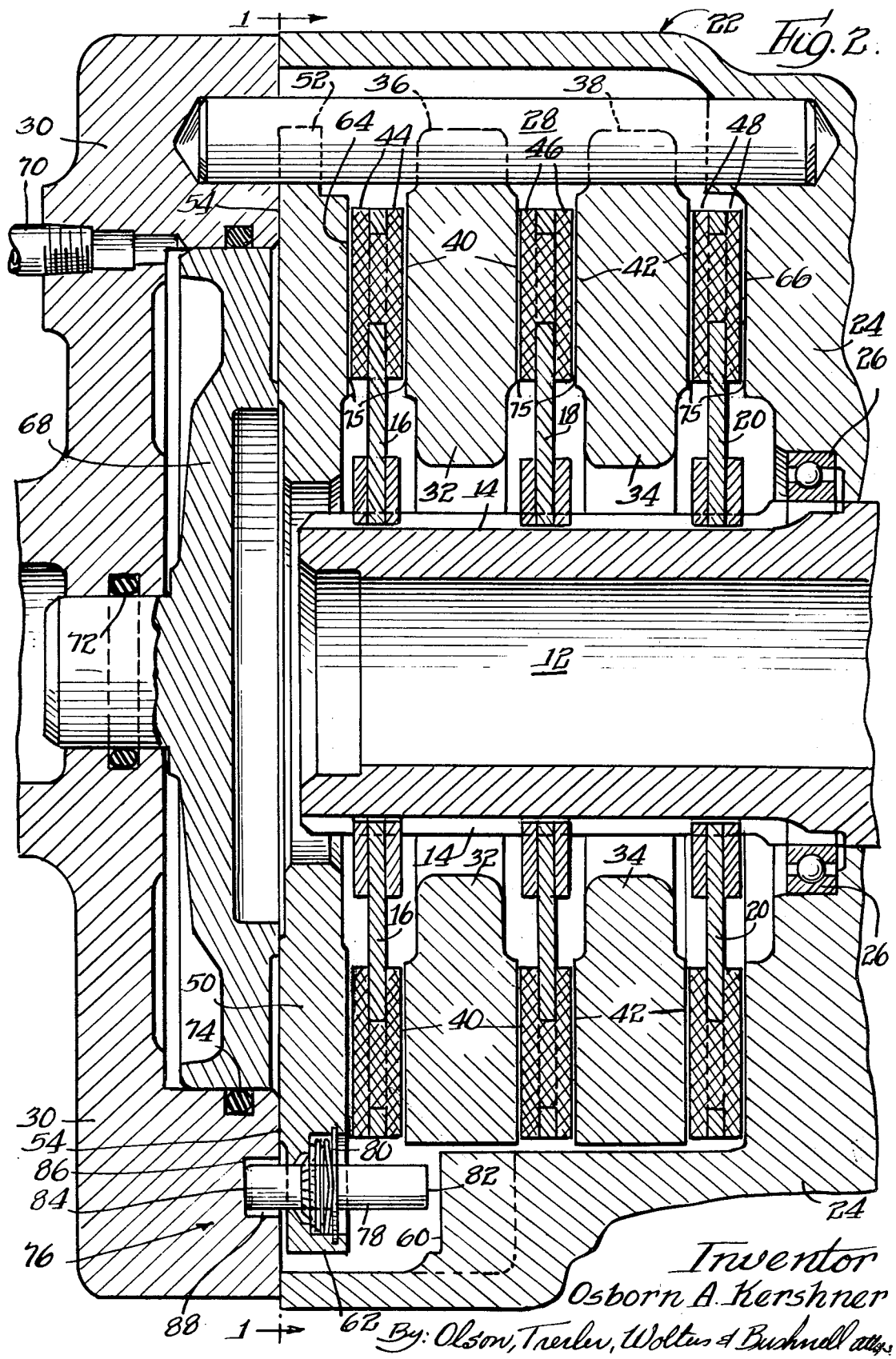
FIG. 2 is a sectional view taken generally along the line 2—2 in FIG. 1.

Turning now to the drawings wherein like components are designated by like reference numerals throughout the various figures, a self-adjusting brake assembly, constructed in accordance with the present invention, is illustrated in FIGS. 1 and 2 and designated by the reference numeral 10. The assembly is provided for retarding or stopping the rotational movement of a cylindrical elongated shaft or axle 12. In order to accomplish this, the shaft or axle includes a plurality of circumferentially spaced and longitudinally extending splines or channels 14 which receive a plurality of circumscribing, longitudinally spaced and substantially flat annular rotary disc members 16, 18 and 20, which are preferably constructed of stamped sheet metal. In this manner, disc members 16, 18 and 20 not only rotate along with shaft 12, but also are capable of axially or longitudinally shifting relative thereto, which, as will be seen hereinafter, is necessary for stopping the rotational movement of the shaft. While only three disc members are shown, it is to be understood that any reasonable number is contemplated by the invention.

Directing attention to FIG. 2, brake assembly 10 is shown to include a substantially cylindrical closed housing 22 which is partially opened at its right end 24, as viewed in FIG. 2, for receiving one end portion of shaft or axle 12, the housing being fixed thereat by a plurality of circumferentially spaced apertured lugs 25 formed therewith. An annular bearing 26 mounted within the housing and circumscribing shaft 12 reduces frictional drag and therefore allows the shaft to rotate freely relative to the housing. Also mounted within housing 22 are two elongated cylindrical torque pins 28 which are diametrically spaced from each other on opposite sides of shaft 12, as viewed in FIG. 1. The torque pins, which are in parallel relationship with shaft 12, extend between and are rigidly held at opposite ends to the right end 24 of housing 22 and a left end 30 thereof, as viewed in FIG. 2, and are provided for reasons discussed below.

Brake assembly 10 further includes two substantially flat annular fixed disc members 32 and 34 which are positionedbetween rotating disc members 16, 18 and 20, and which circumscribe rotating shaft 12, as illustrated in FIG. 2. The fixed discs 32 and 34 are held within housing 22 merely by respective pairs of U-shaped extension flanges 36 and 38 which extend radially outwardly from diametrically opposite peripheral edge portions of the fixed disc members, as illustrated in FIG. 2. The legs of each of these U-shaped extension flanges are positioned for receiving a corresponding torque pin 28 therebetween, for preventing rotational movement of the fixed disc members 32 and 34. However, it should be noted that the fixed disc members are free to shift longitudinally or axially relative to the shaft, so that opposite substantially flat annular side surfaces 40 and 42 of the respective fixed disc members engage adjacent corresponding sides of rotary disc members 16, 18 and 20 in a manner and for reasons to be described below. In this regard, each of the annular rotary disc members includes a pair of annular friction pads 44, 46 and 48 which are positioned on opposite sides of the respective rotary member for frictionally engaging with the fixed discs.

An annular actuator plate 50 is also disposed around shaft or axle 12 within housing 22 and positioned in confronting relationship with and between the annular rotary disc member 16 and the left end 30 of housing 22, as illustrated in FIG. 2. Like fixed disc members 32 and 34, the actuator plate includes diametrically spaced U-shaped extension flanges 52 extending from opposite peripheral edge portions for receiving torque pins 28, as illustrated best in FIG. 1. In this manner, actuator plate 50 is freely shiftable in an axial or longitudinal direction relative to shaft 12 while being incapable of rotational movement about the longitudinal axis of the shaft.

The actuator plate is spring-biased against the flat vertically extending annular inner abutment surface 54 formed with the left end 30 of housing 22 by a plurality of elongated spring elements 56. As seen in FIG. 4, each of these spring elements is mounted within a cavity 58 provided by an inwardly extending vertical abutment surface 60 of housing 22, the surface 60 being laterally spaced from and in confronting relationship with the surface 54, as illustrated in FIG. 2. The spring element thereafter extends outwardly from surface 60 and against the inner surface of a corresponding extension flange 62 formed with and extending outwardly from a peripheral edge portion of actuator plate 50. As noted in FIG. 1, there are two such peripheral extension flanges 62 and four spring elements 56 which provide sufficient force for adequately biasing the actuator plate against surfaces 54 of housing 22.

In order to stop the rotational movement of shaft or axle 12, it is readily apparent that actuator plate 50 must be driven to the right, as viewed in FIG. 2, or axially away from surface 54 of housing 22, so as to squeeze or otherwise force the rotary disc members 16, 18 and 20 into frictional engagement with fixed disc members 32 and 34, all of which are frictionally squeezed against the inner surface 64 of actuator plate 50 and the vertically extending annular inner surface 66 defined by the right end 24 of housing 22. In this manner, the rotational movement of rotating disc members 16, 18 and 20 is retarded, which in turn retards or stops the rotational movement of shaft 12.

In order to shift actuator plate 50 in the aforementioned manner, a hydraulically operated piston 68 is positioned within housing 22 between actuator plate 50 and left end 30 and is mounted thereat for movement perpendicularly towards and away from the actuator plate. A hydraulic inlet 70 is provided in the left end 30 of housing 22, as illustrated in FIG. 2, for directing fluid, from a source not shown, to the piston, whereupon the piston moves into engagement with the actuator plate for shifting the latter in the aforementioned manner and thereby stopping the rotational movement of rotary disc members 16, 18 and 20, and therefore shaft or axle 12. As noted in FIG. 2, annular bearing seals 72 and 74 are disposed around piston 68 so as to prevent the fluid from either leaving the housing through end 30 or from entering the housing through the front of the piston.

From the aforementioned description, it is readily apparent that, as rotating discs 16, 18 and 20 continuously function to stop the rotational movement of shaft or axle 12, their associated friction pads 44, 46 and 48 tend to wear thin so as to progressively increase the running clearance 75 required when the brake assembly is in a deenergized state. Accordingly, if left unadjusted, the actuator plate 50 would have to be shifted continuously greater distances so as to compensate for this increase in running clearance, which in turn would necessarily cause an increase in braking time and use of excessive brake fluid.

In accordance with the present invention, the brake assembly is provided with automatic adjuster means for maintaining substantially constant the distance required for axially or longitudinally shifting the actuator plate 50 in order to stop the rotating disc members and therefore the shaft 12, regardless of the amount of wear to the friction pads. Such automatic adjuster means are preferably provided at diametrically opposite sides of the actuator plate 50, as illustrated in FIG. 1, and are generally designated by the reference numeral 76. While only one such means is necessary, two or more thereof provides for a more reliable operation. Referring more particularly to FIGS. 3 through 7, one such automatic adjuster 76 is clearly shown in detail, and it is to be understood that the other adjuster (or others which may be provided) with which the brake is preferably provided will correspond thereto.

The automatic adjusters each include a cylindrical elongated pin element 78 having a substantially smooth longitudinal surface and mounted for longitudinally slidable movement through an opening 80 extending through the extension flange 62 of adjuster plate 50, as illustrated in FIG. 2. The pin element extends outwardly from opposite sides of the actuator plate and perpendicular therewith, so that the right transverse edge 82 of the pin element is in confronting parallel relationship with the surface 60 of housing 22, as seen in FIG. 2, while the left transverse edge 84 is in confronting parallel relationship with the inner vertical surface 86 provided by the opening or channel 88 extending inwardly from the surface 54 of the housing.

Turning to FIG. 3, opening 80 is partially defined by a bore 81 extending through extension flange 62 and providing a cylindrical substantially smooth bearing surface 83 which aids in slidably guiding pin element 78 through opening 80. Opening 80 is further defined by a counter-bore 85 having a cross-sectional diameter substantially greater than the diameter of bore 81 and provided adjacent bore 81. An additional counter-bore 87, which is of even greater cross-sectional diameter than counter-bore 85, and which is provided adjacent the latter, as illustrated in FIG. 3, concludes opening 80. As noted, the counter-bores 85 and 87 cooperate to define an inwardly extending annular shoulder 100 which is provided for reasons to be described below. In addition, it should be noted that counter-bore 85 limits the axial distance of bearing surface 83 so that the latter is relatively short as compared to the over-all thickness of actuator plate 50. In this manner, frictional drag between the bearing surface and pin element 78 is minimized, so that the bearing surface acts more accurately as a guide for the pin element.

Each of the automatic adjusters includes a one-way washer assembly 90 which limits the axial slidable movement of pin element 78 to the direction indicated by arrow 92 or longitudinally to the left as viewed in FIG. 3, and prevents the pin from moving longitudinally or axially to the right as viewed in that figure. This is achieved by the utilization of a pair of annular members 94 and 96 (or any reasonable number including one thereof) which are concentrically disposed around pin element 78, and which are maintained in spaced-apart relationship with respect to each other by an annular spacer washer 98. The annular members 94 and 96 are positioned within the counter-bore 87 of extension flange 62 and spring forced against the inwardly extending annular shoulder 100 by a spring washer 99 which, in turn, is locked in place by a snap ring 101 held within an annular groove 103 circumscribing counter-bore 87.

The inner peripheral edge of each of the annular members 94 and 96 includes inwardly extending circumferentially spaced resilient teeth 102 and 104, respectively, which extend axially at an angle, slightly to the left as viewed in FIG. 3, and into counter-bore 85 just below shoulder 100. In this manner, counter-bore 85 provides clearance for the teeth relative to bearing surface 83.

The inner edges of teeth 102 and 104 display circles having diameters substantially less than the cross-sectional diameter of pin element 78 so that the engaging edges thereof aggressively engage the surface of the pin element for preventing the latter from moving in a direction against the arrow 92. It is readily apparent, however, that due to the angle of teeth 102 and 104, the pin element may readily slide in the direction of arrow 92. It should be noted, that the annular members 102 and 104 are constructed of material substantially harder than that of pin element 78, so that the inner tooth edges score or otherwise cut into the pin element for more reliably preventing the latter from moving against arrow 92.

Because pin element 78 relies solely on assembly 90 (as opposed to bore 81) for its one-way operating limitation, the bore, along with counter-bores 85 and 87, may be of greater tolerances, which in turn minimizes the cost of manufacture.

Turning now to the manner in which the automatic adjuster means operates, attention is directed back to FIG. 2 which shows the brake assembly 10 in a deenergized position. In this position, actuator plate 50 is held in its biased position against surface 54 of housing 22, while the left transverse edge 84 of pin element 78 engages surface 86. In this manner, running clearance 75 exists on each side of each annular rotating disc member 16, 18 and 20, respectively, so that the latter may freely rotate and thereby allow shaft or axle 12 to so rotate.

Turning to FIG. 5, the brake assembly 10 is shown in its initial energizing or braking condition, that is, with actuator plate 50 shifted longitudinally to the right, for frictionally stopping the rotational movement of the rotating discs 16, 18 and 20. In this state, it can readily be seen that the actuator plate is shifted a distance L away from the housing surface 54, causing the left transverse edge of pin element 78 to move a like distance away from housing surface 86. It should be noted, that with the aforementioned movement of actuator plate 50 and pin element 78, the right transverse edge 82 of pin element 78 just barely engages the surface 60 of housing 22. Upon deenergizing the brake assembly, the actuator plate 50 and pin element 78, of course, return to their biased positions, through the force of spring elements 56, in the manner described above.

As stated above, as the friction pads 44, 46 and 48 continuously function to stop the rotational movement of shaft 12, they progressively wear thin, which in turn causes great running clearances, so that the actuator plate 50 is required to move a greater distance during brake energization. This is illustrated in FIG. 6, where the brake assembly is shown in its energized position after being in use for a period of time. As noted there, actuator plate 50 is now positioned a distance L+ΔL from housing surface 54, the additional incremental distance ΔL representing the combined wear of friction pads 44, 46 and 48 or combined increase in running clearance. As the actuator plate moves through this distance L+ΔL, the housing surface 60 engages the right transverse edge 82 of pin element 78 and shifts the latter a distance ΔL, relative to the actuator plate, and annular members 94 and 96 in the direction indicated by arrow 106. Upon deenergizing the brake assembly and returning the actuator plate to its biased position, as illustrated in FIG. 7, the left transverse edge 84 of pin element 78, which has been shifted to the left a distance ΔL relative to the actuator plate, engages the housing surface 86 for thereby repositioning the actator plate a distance ΔL from the housing surface 54. In this manner, when the brake assembly 10 is again energized, the actuator plate 50 is required to move only a distance L for stopping the rotational movement of shaft or axle 12.

While the operation of automatic adjuster means 76 has been described in rather spaced-apart steps, it is obvious that as the friction pads 44, 46 and 48 progressively wear, the pin elements 76 progressively shift to the left, as viewed in FIGS. 5 through 7, so that the distance required to move actuator plate 50 remains substantially constant, i.e., a distance L. This, of course, provides for a substantially constant braking time and therefore a more accurate and reliable assembly.

While a preferred embodiment of the invention has been shown, it should be understood, of course, that the invention is not limited thereto, since many modifications may be made. It is, therefore, contemplated to cover by the present application any such modifications as fall within the true spirit and scope of the appended claims.

The invention is claimed as follows:

1. In a disc brake assembly, an actuator disc axially shiftable between a first retracted position and a second advanced brake energizing position, said disc including a bore having a portion that constitutes a slide bearing and guide means having an axis parallel to a central axis of the disc, said bore also including adjacent counterbore portions of different diameters defining a shoulder in the larger diameter counterbore portion, said slide bearing and guide means having an axial dimension that is small as compared to the axial dimension of said disc at said bore, an elongated pin of predetermined diameter and length axially slidably disposed in said bearing and guide means projecting axially through said counterbore portions and from opposite sides of the disc for engagement with first and second fixed abutment surfaces of the brake assembly spaced apart a distance slightly greater than said predetermined length and substantially in accordance with a predetermined running clearance for the brake assembly, and means fixed to and carried by said actuating disc and engaging said pin for positively limiting slidable movement of the pin in one direction while permitting movement in an opposition direction relative to the actuator disc for compensating for wear in the brake assembly and maintaining the desired running clearance, said last-named means being substantially entirely within the larger of said counterbore portions and being seated against said shoulder.

2. A disc brake assembly according to claim 1 wherein said last-named means includes a plurality of annular locking members with a plurality of annularly arranged resilient axially inclined teeth presenting tooth edges aggressively engaging said pin.

3. A disc brake assembly according to claim 2 wherein said tooth edges normally define a circle having a diameter substantially less than the diameter of said pin for causing said tooth edges to cut away the surface portion of said pin upon movement of the pin relative to the disc in said opposite direction.

4. A disc brake assembly according to claim 1 wherein said bearing and guide means has a diameter larger than the diameter of said pin for permitting the pin to slide freely therethrough and said locking means are axially spaced from said bearing means for preventing interference between said teeth and said bearing means.

5. A disc brake assembly according to claim 1, wherein the last-mentioned means includes an annular locking member with a plurality of annularly arranged resilient axially inclined teeth presenting tooth edges within the smaller diameter counterbore portion aggressively engaging said pin.

6. A disc brake assembly according to claim 1, wherein the last-named means includes a plurality of annular locking members separated by spacer washer means and the locking members having annularly arranged resilient axially inclined teeth presenting tooth edges aggressively engaging said pin.

7. A disc brake assembly according to claim 6, wherein the teeth of the annular locking member adjacent said shoulder extend within the smaller diameter counterbore portion.

* * * * *